Patented July 23, 1935

2,009,321

UNITED STATES PATENT OFFICE 2,009,321

METHOD OF PACKAGING COFFEE

Ronald B. McKinnis, Pittsburgh, Pa., assignor to Continental Can Company, Inc., New York, N. Y., a corporation of New York No Drawing. Application July 28, 1932, Serial No. 625,536

2 Claims. (Cl. 99—8)

The invention relates to new and useful improvements in hermetically sealing ground coffee in metal containers.

An object of the invention is to provide a method of packaging coffee whereby the sealed container is relieved of excessive pressure causing undue strains on the container and the swelling or bulging of the walls thereof.

A further object of the invention is to provide a method of packaging coffee whereby air and the oxygen content thereof, is removed from the coffee product and the container so that the coffee is maintained sealed in a container in an atmosphere free from oxygen.

It is well known that coffee contains within its cells a gas under high pressure which gradually evolves from the coffee and over a period of several days, even when the coffee is ground. Coffee when sealed in containers, even in vacuum, will replace the vacuum with the evolving coffee gas and cause a swelling of the ends of the container.

It is also well known that when coffee contacts with the oxygen of the air and particularly after the evolving gas has passed from the coffee, or a substantial portion thereof, the oxygen contacts with the oils of the coffee, causing rancidity, a loss of flavor and staleness of the coffee product.

Efforts have been made to remove the oxygen from the container by drawing a very high degree of vacuum thereon and also by replacing the vacuum with an inert gas and repeating the operation through several cycles. There is still oxygen left in the container and the coffee product.

In carrying out the present invention, the coffee is first roasted and is then ground in any well known manner to produce broken coffee particles. These coffee particles are tempered and passed through rolls so that the particles are crushed and the coffee gas, or the greater portion thereof, in the cells of the coffee forcibly expelled therefrom. This reduces the coffee particles to very thin flakes which are firm and can be readily handled for the packaging of the same.

In my Patent No. 1,903,362, I have shown, described and claimed, a coffee product and the method of making the same, whereby the coffee gas is expelled from the cells of the coffee particles.

The coffee flakes with the coffee gas, or a greater portion thereof, expelled therefrom, are placed in a metal container and the container is then subjected to a vacuum creating apparatus for drawing a vacuum thereon. The vacuum may be replaced by an inert gas and the container again subjected to a vacuum treatment for drawing from the coffee more oxygen and the inert gas, and thereby reducing to a smaller limit the amount of oxygen retained in the container. The container is sealed, either under vacuum or with an inert gas therein, and when it is sealed there is still a small amount of oxygen in the coffee product and in the container. The sealed containers are then heated to a temperature of from 100° C. to 120° C. for approximately thirty minutes and the contents thereof are preferably agitated during heating by rotating. The heating of the container and the agitating of the contents thereof during heating, result in the absorbing of the last trace of oxygen from the atmosphere within the container. This quick absorption of the oxygen due to the heating of the contents of the container, does not in any way impair the quality of the coffee, which is likely to occur through the slow volatilization of the aromatic constituents in the presence of oxygen at normal room temperature.

As the result of my improved method of packaging coffee, the coffee is retained in a metal container which is sealed in an atmosphere free from oxygen and without the presence of the evolving coffee gas so that there is no strain on the container or resulting swelling or bulging of the walls of the container.

Having thus fully described the invention, what I claim as new and desire to secure by Letters Patent is:

1. The method of packaging roasted coffee consisting in grinding the roasted coffee, subjecting the freshly ground particles of coffee to pressure for reducing said coffee particles to the form of thin flakes of such uniform thinness as to expel from the coffee particles the coffee gas therein, placing the coffee flakes in a metal container, subjecting the container to vacuum, replacing the vacuum with an inert gas, and sealing the container.

2. A method of packaging roasted coffee consisting in grinding the roasted coffee, subjecting the ground particles of coffee to pressure for reducing said coffee particles to the form of thin flakes of such uniform thinness as to expel from the coffee particles the coffee gas therein, placing the coffee flakes in a metal container, subjecting the container to vacuum, replacing the vacuum with an inert gas, sealing the container, and heating the container to a temperature and for a time sufficient to quickly absorb the last trace of oxygen from the container.

RONALD B. McKINNIS.